United States Patent [19]

Miller

[11] Patent Number: 5,061,742

[45] Date of Patent: Oct. 29, 1991

[54] STABLE ACRYLIC COPOLYMER DISPERSIONS

[75] Inventor: Michael M. Miller, Cincinnati, Ohio

[73] Assignee: Hi-Tek Polymers, Inc., Jeffersontown, Ky.

[21] Appl. No.: 524,010

[22] Filed: May 16, 1990

[51] Int. Cl.$^5$ .................. C08K 3/20; C08G 63/48; C08F 8/00; C08L 63/00

[52] U.S. Cl. .................. 523/402; 523/406; 523/407; 523/409; 523/412; 523/423; 525/31; 525/119

[58] Field of Search .................. 525/119, 31; 523/402, 523/406, 409, 412, 423, 407

[56] References Cited

U.S. PATENT DOCUMENTS 2,954,358  9/1960  Hurwitz .................. 525/119
4,399,242  9/1983  Fowler et al. .................. 524/591

Primary Examiner—Paul R. Michl
Assistant Examiner—Patrick Niland
Attorney, Agent, or Firm—Herbert P. Price

[57] ABSTRACT

Stable aqueous acrylic resin dispersions are made from a dispersion in water of the reaction product of a carboxylic acid containing acrylic resin and a diglycidyl ether of a polyoxyalkylene glycol.

16 Claims, No Drawings

STABLE ACRYLIC COPOLYMER DISPERSIONS

BACKGROUND OF THE INVENTION

The field of art to which this invention is directed is stable aqueous dispersions of acrylic polymers.

Acrylic ester resin emulsions are well known, having been made commercially for at least 30 years. Such emulsions are made by polymerizing acrylic ester monomer in water using nonionic and anionc surfactants as emulsifiers. Emulsions of this type have been used to manufacture various types of coatings, e.g., exterior and interior house paints. Such emulsions have found limited utility in industrial applications due to the lack of resistance properties, e.g., water resistance, which industrial coatings require.

As described in U.S. Pat. No. 4,177,177, polymer emulsions have been made by the emulsion polymerization of monomers, referred to hereinabove; by the direct emulsification of an organic solvent solution of the polymer in water using an oil-in-water type emulsifier; by the inversion emulsification of an organic solvent polymer solution by adding water to the polymer solution using an oil-in-water emulsifier which can act also as a water-in-oil emulsifier; by emulsification by neutralization wherein acid groups in the polymer are neutralized with a base, e.g., an amine, and the salted polymer is emulsified in water.

In addition to the conventional nonionic and anionic surfactants, various kinds of compounds have been used as dispersants in forming aqueous dispersions of various polymers. One particularly useful dispersant for epoxide resins is described in French Patent No. 2,319,417 and U.S. Pat. No. 4,315,044. This dispersant is the diglycidyl ether of polyoxyalkylene glycols, made from the reaction of epichlorohydrin and the glycol.

In U.S. Pat. No. 3,305,601, organic solvent solutions of acrylic resins containing carboxylic acid functionality are blended with epoxy resins and are cured to form tough, thermoset coatings.

Due to environmental concerns, there is an ongoing effort to decrease or eliminate the use of organic solvents in protective and ornamental coatings and to formulate coatings in aqueous systems which have properties equal to or better than the organic solvent systems.

SUMMARY OF THE INVENTION

This invention is directed to acrylic resins. In one aspect, this invention pertains to stable aqueous acrylic resin dispersions. In another aspect, this invention relates to a process for preparing stable aqueous acrylic resin dispersions. In still another aspect, this invention pertains to thermosetting coating compositions made from the stable aqueous acrylic resin dispersions and epoxy resins.

The stable aqueous resin dispersion of this invention is made up of an aqueous medium having dispersed therein the reaction product of an acrylic resin having an acid value of about 10 to about 150 and a diglycidyl ether of a polyoxyalkylene glycol, wherein said polyoxyalkylene glycol is a block copolymer of ethylene oxide and propylene oxide with the polyoxypropylene blocks in the middle of terminal polyoxyethylene blocks.

The stable aqueous resin dispersion of this invention when blended with epoxy resins is useful in the formulation of coatings which cure under ambient conditions or when heated to elevated temperatures.

DESCRIPTION OF THE INVENTION

The acrylic resins useful in this invention are copolymers of ethylenically unsaturated polymerizable monomers wherein at least one monomer is a polymerizable acid, i.e., a monomer containing a carboxylic acid group. The term "acrylic resins" as used herein is intended to cover copolymers of monomers wherein about 25 up to 100 weight percent of the monomers are acrylic monomers.

Examples of acrylic monomers useful in this invention are the acrylic and methacrylic esters wherein the ester group contains from 1 to 18 carbon atoms. Examples of such monomers are methyl acrylate, methyl methacrylate, ethyl acrylate, ethyl methacrylate, butyl acrylate, butyl methacrylate, 2-ethylhexyl acrylate, nonyl acrylate, hydroxyethyl acrylate, hydroxy propyl acrylate, hydroxyethyl methacrylate, hydroxy propyl methacrylate, and the like. Other useful acrylic monomers are acrylonitrile, methacrylonitrile, acrylic acid, and methacrylic acid.

Other monomers which are useful in this invention are monomers copolymerizable with acrylic monomers such as styrene, vinyl toluene, dimethyl maleate, diethyl fumarate, dibutyl maleate, half esters of maleic or fumaric acid, e.g., ethyl acid maleate, butyl acid fumarate and the like. Additional monomers are maleic acid, fumaric acid and itaconic acid.

The acrylic resins useful in this invention contain as one of the monomer components at least one of the acid monomers named above in an amount sufficient for the acrylic resin to have an acid value of about 10 to about 150. This amount of acid monomer is about 1.5 to about 23 weight percent of the total monomer weight. The preferred acid value is about 75 to about 85 with the amount of monomer, e.g., acrylic acid, being about 9 to about 11 weight percent.

Preferred monomers useful in this invention are acrylic and methacrylic acid, acrylic or methacrylic esters wherein the ester group contains 1 to 4 carbon atoms, and styrene or vinyl toluene. The most preferred monomers are acrylic acid, butyl acrylate, and styrene.

The acrylic resins used in this invention are well-known compositions and are prepared by solution polymerization techniques using free-radical catalyst. Such procedures are described in U.S. Pat. No. 3,305,601 which is hereby incorporated by reference. Organic solvents used to prepare the acrylic resins are, preferably, those which are substantially water-miscible, either in the form of a single polar compound or as a mixture which can include non-polar constituents. Suitable organic solvents, either alone or in admixture, include hydroxyethyl acetate, 2-ethoxyethyl acetate, propylene glycol monomethyl ether, propylene glycol monoethyl ether, 2-propoxyethanol, ethylene glycol monobutyl ether, diethylene glycol monobutyl ether, and the like. Additional solvents include ketones, such as methyl ethyl ketone and methyl isobutyl ketone. Non-polar solvents which can be included as a minor constituent of the organic solvent component include aliphatic and aromatic hydrocarbons, such as naphtha, heptane, hexane, mineral spirits, toluene, xylene, and the like.

The acrylic resin solutions useful in this invention are those which have a viscosity of less than about 10,000 cps at 200° F. and a solids content of about 25 to about 80 percent. Preferably, the viscosity will be less than about 5000 cps at 200° F. and the solids content will be about 40 to about 80 weight percent.

The diglycidyl ether of a polyoxyalkylene glycol useful in this invention is the diglycidyl ether of block copolymers of ethylene oxide and propylene oxide wherein the polyoxypropylene block is in the middle with the polyoxyethylene blocks being in the terminal positions. Such polyoxyalkylene glycols have molecular weights of about 4,000 to about 20,000 and are derived from about 50 to about 90 weight percent ethylene oxide and about 10 to about 50 weight percent propylene oxide. The diglycidyl ethers are prepared by reacting the polyoxyalkylene glycol with epichlorohydrin using a Lewis acid catalysts, followed by dehydrohalogenation with caustic. Such diglycidyl ethers are described in detail in French Patent No. 2,319,417, which is hereby incorporated by reference. The amount of diglycidyl ether used in this invention is about 2 to about 10 weight percent and, preferably about 5 to about 7 weight percent wherein said weight percents are based on the weight of acrylic resin and diglycidyl ether.

The acrylic resin and the diglycidyl ether are reacted by mixing the two components with or without a carboxy epoxy catalyst and applying heat until the glycidyl groups react with the carboxylic acid groups of the acrylic resin. Generally, the reaction is conducted at a temperature of about 225° F. to about 300° F. for about 1 to about 4 hours. Preferably, a small amount of a basic catalyst, such as alkali metal hydroxides, carbonates or organic acid salts, or a tertiary amine is used. Alternatively, the monomers used to prepare the acrylic resin can be polymerized in the presence of the diglycidyl ether of the polyoxyalkylene glycol.

In preparing the compositions of this invention, water is added to the acrylic resin-diglycidyl ether reaction product with stirring to form first a water-in-oil emulsion which inverts to an oil-in-water emulsion or dispersion. The solids content of the acrylic resin-diglycidyl ether reaction product and organic solvent, prior to the addition of water, is about 40 to about 80 weight percent. Sufficient water is added to bring about the inversion to the oil-in-water state. Generally, this amount of water will be sufficient to reduce the solids content of the dispersion to about 30 to about 55 weight percent. The viscosity of the dispersions is about 5000 to about 17,000 cps at 25° C. Additional water can be added to the dispersion for viscosity adjustment if necessary.

The emulsification or dispersion process is conducted at room temperature up to about 200° F. Preferably, the process is conducted at about 150° to about 180° F.

Aqueous dispersions of the acrylic resin can be made using the diglycidyl ether of a polyoxyalkylene glycol as the dispersing agent without coreacting the resin and diglycidyl ether. However, such dispersions are inferior in stability to those made according to this invention.

The aqueous acrylic dispersions of this invention are used in combination with epoxy resins for formulating thermosetting coatings which cure under ambient conditions as well as when heated. Useful epoxy resins are the well-known polyglycidyl ethers of polyhydric phenols which are made by the reaction of polyhydric phenols with epichlorohydrin. Examples of such epoxy resins are those derived from resorcinol, p,p'-dihydroxy diphenyl, p,p'-dihydroxydiphenyl propane (commonly called bisphenol A), p,p'-dihydroxydiphenyl ethane, novolak resins and the like. Generally, such epoxy resins have epoxide equivalent weights of about 110 to about 400. Preferred epoxy resins for use in this invention are those based on bisphenol A having epoxide equivalent weights of 175 to about 350, most preferably 180 to 220.

Other epoxy resins which can be used in this invention are polyglycidyl esters, i.e., reaction products of epichlorohydrin and polybasic acids, e.g., azelic acid, dimer acids of fatty acids, adipic acid, sebacic acid, the phthalic acids and the like. Other epoxy resins are those made by the epoxidation of unsaturated hydrocarbons, e.g., 3,4-epoxy-6-methyl cyclohexane carboxylate.

In formulating the coatings compositions, resins are blended with the acrylic dispersions in amounts based on epoxide equivalents and carboxylic acid equivalents. Generally, the equivalent ratios will be about 0.5 to about 1.5 epoxide equivalents per each carboxylic acid equivalent. Preferably the ratios will be about 0.75 to about 1.25 to 1, and most preferably, about 1 to 1.

Blends of the aqueous acrylic resin dispersions and epoxy resins when used as coating compositions are curable at room temperature or by heating up to temperature of about 150° C. or higher. Preferably, the compositions are used in room temperature curing formulations.

In addition to epoxy resins, the acrylic resin dispersions can be blended with other polyfunctional reactants, e.g., aminoplast resins, phenolplast resins, blocked polyisocyanates and the like.

When formulated into coatings, the aqueous acrylic dispersions and crosslinking agents can contain other components conventionally used in coating technology, i.e., pigments, flow-control aids, thickeners and the like.

The following examples describe the invention in greater detail. Parts and percentage, unless otherwise designated, are parts and percentages by weight.

EXAMPLE 1

To a suitable reactor were added 4951 parts of 2-propoxy ethanol. To a monomer addition tank were added 5955 parts of styrene, 4597 parts of butyl acrylate and 1466 parts of acrylic acid. After thorough mixing, 241 parts of 2,2'-azobis(isobutyronitrile) were added. Heat and agitation were applied to the reactor and the temperature was raised to 200° F. The monomer solution was then added over a period of 3 hours while keeping the temperature at 200° F. The addition tank was flushed with 200 parts of 2-propoxyethanol which was added to the reactor. The temperature was held at 200°-210° F. for 1 hour. Di-tertiary butyl peroxide, 65.6 parts, was then added. The temperature was raised to 255°-265° F. and was held at this temperature range for 3 hours to complete the polymerization reaction. The temperature was lowered to 200°-210° F. and the acrylic polymer solution was filtered through a 10 micron filter press and into containers.

The acrylic polymer solution had a Gardner-Holdt viscosity of $Z_8$ at 25° C. and 70 percent solids.

EXAMPLE 2

To a suitable reactor were added 201 parts of the acrylic polymer solution of Example 1, 9.5 parts of the diglycidyl ether of Pluronic F88 (BASF - Wyandotte) and 0.02 part of sodium benzoate. Pluronic F88 is a block copolymer of ethylene oxide and propylene oxide with the polyoxypropylene block in the middle with terminal polyoxyethylene blocks. The copolymer contains 80 weight percent ethylene and 20 weight propylene and has an average molecular weight of 10,800. Heat and agitation were applied raising the temperature to 280° F. The temperature was held at 275°-280° F. for 1 hour and was cooled to 160° F. Deionized water, 74.2 parts, was then added over a period of one hour and 30 minutes with the temperature dropping to 125° F. A creamy smooth water-in-oil emulsion first formed which inverted to an oil-in-water emulsion. Additional deionized water, 54.4 parts, was added over 28 minutes. An additional 16 parts of deionized water were added to adjust the solids content to 43 percent. The resulting dispersion had a viscosity of 160 cps at 25°0 C., measured with a Brookfield viscometer, No 1 spindle at 20 rpm.

After 25 days at room temperature, the dispersion had very slight solvent separation and a small amount of settling.

EXAMPLE 3

Using the same procedure described in Example 2, 930 parts of the acrylic polymers solution described in Example 1 were mixed with 43.9 parts of the diglycidyl ether described in Example 2, and 0.09 part of sodium benzoate. After heating at 280° C. for 1 hour, 343.2 parts of deionzed water were added to form first a water-in-oil emulsion which inverted to an oil-in-water emulsion. Additional water, 126.5 parts, was added bringing the solids content to 49.33 percent. The viscosity at 25° C. was 9810 cps, #5 spindle at 20 rpm. After 15 days at room temperature, the dispersion exhibited slight solvent separation which could easily be stirred in.

A portion of the dispersion was reduced to 45.9 percent solids with additional water. The viscosity at 25° C. was 1290 cps. After 15 days, the dispersion exhibited soft settling which could easily be stirred in.

EXAMPLE 4

To a suitable reactor were added 846 parts of ethylene 768.8 parts of methyl methacrylate, 976.5 parts of butyl methacrylate, 330.0 parts of hydroxypropyl methacrylate, 174.8 parts of methacrylic acid and 118.5 parts of cumene hydroperoxide. Approximately, 20 percent of the monomer-catalyst mixture was added to the reactor, and heat and agitation were applied. When the temperature reached 300° F., addition of monomer-catalyst solution was begun. The addition was completed in 3 hours and 5 minutes with the temperature at 310° F. Heating was continued for 2 hours holding the temperature at 300°-310° F. The diglycidyl ether of the polyoxyalkylene glycol described in Example 2, 151.2 parts, was then added along with 0.3 part of sodium benzoate. The temperature was held at 300° F. for 1 hour and 20 minutes. The resulting acrylic resin solution had a viscosity (Gardner-Holdt at 25° C.) greater than $Z_8$ at 70 percent solids and an acid value, solids basis of 50.3.

To another reactor were added 996 parts of the acrylic resin solution. Heat agitation were applied and the temperature was raised to 160° F. Deionized water was then added, first forming a water-in-oil emulsion, followed by inversion to an oil-in-water emulsion. A total of 673 parts of water were added. The resulting stable dispersion at 41.5 percent solids had a viscosity of 18,500 cps at 25° C.

Several dispersions were made using the diglycidyl ether of Example 2 as the dispersant. These dispersions differed from Examples 2, 3, and 4 in that the dispersant was not coreacted with carboxylic aid groups of the acrylic copolymer. The details of these Examples are as follows:

EXAMPLE 5

To a suitable reactor were added 1102.5 parts of the acrylic polymer solution described in Example 1 and 52.1 parts of the diglycidyl ether described in Example 2. Heat was applied raising the temperature to 205° F. in order to dissolve the diglycidyl ether. The temperature was then lowered to 180° F., and 288.3 parts of deionized water were added over 58 minutes. A water-in-oil emulsion was formed initially followed by inversion to an oil-in-water dispersion. Additional deionized water, 230.9 parts, was added over 30 minutes. A smooth dispersion having a viscosity of 312 cps at 53 percent solids was formed. The dispersion separated badly overnight forming a bottom layer.

EXAMPLE 6

Using the same procedure described in Example 5, 925 parts of the acrylic polymer solution described in Example 1 and 43.7 parts of the diglycidyl ether described in Example 2 were blended together and heated to 215° F. to melt out and dissolve the diglycidyl in the acrylic solution. When solution was obtained, the temperature was dropped to 180° F. A total of 435.5 parts of deionized water were added to form an oil-in-water dispersion having a viscosity at 25° C. of 1220 cps, No. 5 spindle at 20 rpm. The solids content was 52.8 percent.

After 6 days at room temperature, the dispersion exhibited hard settling which could be stirred in. After 18 days, there was solvent separation and hard settling which could be stirred in. After 4 months, the settling could not be stirred in

EXAMPLE 7

Using the same procedure described in Example 5, a dispersion was made using 978 parts of the acrylic solution described in Example 1, 46.2 parts of the diglycidyl ether described in Example 2, and 376.2 parts of deionized water. The resulting oil-in-water dispersion had a viscosity at 25° C. of 1920 cps, No. 5 spindle at 20 rpm and a solids content of 52.8 percent. After 14 days at room temperature, the dispersion had separated with a solvent layer on top. The dispersion could be reformed with stirring.

EXAMPLE 8

As shown by this example, an acrylic resin containing carboxylic acid groups is salted with an amine and dispersed in water.

To a suitable reactor were added 1299 parts of 2-propoxyethanol and 575 parts of xylene. To the monomer addition tanks attached to the reactor were added 911 parts of acrylic acid, 3,703 parts of styrene, 2858 parts of butyl acrylate and 150 parts of 2,2'-azobis-(isobutyronitrile). Agitation was begun and the reactor temperature was raised to 200° F. The monomer-catalyst solution was then added over a 4 hour period while keeping the temperature at 200°-210° F. When the addition was completed, the temperature was held at 200°-210° F. for 1 hour. Di-tertiary butyl peroxide, 40 parts, was then added, the temperature was raised to 255°-265° F. and was held within this range for 1 hour. The temperature was then lowered to 180°-190° F., and 527 parts of triethylamine were slowly added over a 30 minute period with the temperature at 180°-190° F.

After the addition was completed, the temperature was held at 180°–190° C. for 1 hour.

Deionized water, 7072 parts, heated to 180°–190° F., was then added over a 1 hour period. The temperature was then lowered to 150° F. and 400 part of deionized water were added over a 10 minute period. After 30 minutes with the temperature at 150° F., the dispersion was transferred to a storage tank for viscosity equilibration. The viscosity of the dispersion when transferred was 600,000 to 900,000 cps at 42 percent solids. After 5 to 7 days the viscosity dropped to 10,000–25,000 cps.

EXAMPLE 9

Coating compositions were prepared by blending the acrylic resin dispersions of Examples 2, 3 and 4 with the diglycidyl ether of bisphenol A having an epoxide equivalent weight of 190. Coating compositions were also prepared from Example 8, the acrylic dispersion made by amine salting of the carboxylic acid groups, and the diglycidyl ether of bisphenol A. In Table 1 are listed the acrylic resin dispersion by Example number the equivalents of carboxylic acid and epoxy used in each formulation, and the catalyst used in the formulation. The catalysts were triethylamine (TEA), tetramethylammonium hydroxide (TMAH) at 25 percent solids in methanol, tetraethylene diamine (DABCO) at 25 percent in ethylene glycol monopropyl ether and 1,5-diazobicyclo-4,3-non-5-ene (DBN). The percent catalyst is the amount of catalyst, active basis, based on the weight of acrylic resin dispersion solids and epoxy resin.

TABLE 1

| Composition No. | Components | Equivalents | Catalyst | Wt. % |
| --- | --- | --- | --- | --- |
| 1 | Example 2 | 0.098 | DABCO | 2.5 |
|   | Epoxy Resin | 0.119 |   |   |
| 2 | Example 3 | 0.137 | DABCO | 2.5 |
|   | Epoxy Resin | 0.119 |   |   |
| 3 | Example 3 | 0.137 | TMAH | 2.5 |
|   | Epoxy Resin | 0.119 |   |   |
| 4 | Example 3 | 0.137 | DBN | 2.5 |
|   | Epoxy Resin | 0.119 |   |   |
| 5 | Example 3 | 0.137 | DABCO | 1.25 |
|   | Epoxy Resin | 0.119 | TMAH | 1.25 |
| 6 | Example 4 | 0.075 | DABCO | 2.5 |
|   | Epoxy Resin | 0.119 |   |   |
| 7 | Example 8 | 0.118 | TEA |   |
|   | Epoxy Resin | 0.119 |   |   |
| 8 | Example 8 | 0.118 | TEA |   |
|   | Epoxy Resin | 0.119 |   |   |

Films were prepared from the acrylic resin dispersion-epoxy resin blends using a 3 mil Byrd applicator on glass panels. The films were cured at room temperature. The evaluation of the films is shown in Tables 2 and 3.

TABLE 2

| Comp. No. | Time to Clear Film | Tack Free Time | Pencil Hardness after 24 hours | 1 Hour Water Spot after 24 hours | 8 Hour Water Spot after 3 days | Pencil Hardness after 3 Days |
| --- | --- | --- | --- | --- | --- | --- |
| 1 | 35 min | 2 hr | 2B | Faint Spot | Spot | 2B |
| 2 | 70 min | 1.5 hr | 3B | Spot | Spot | HB |
| 3 | 55 min | 3 hr | >6B | White Spot | Hazy Spot | B |
| 4 | 32 min | 3 hr | >6B | Faint Spot | Hazy Spot | B |
| 5 | 60 min | 2 hr | 5B | Faint Spot | Hazy Spot | B |
| 6 | 40 min | 4 hr | 4B | White Dense Spot | Hazy Spot | HB |
| 7 | 15 min | 2 hr | 5B | Spot Softens | Spot | 4B |
| 8 | 35 min | 3 hr | >6B | White Spot Dense Blisters | Spot | 2B |

TABLE 3

| | Evaluation after 8 days at Room Temperature, 24 Hour Spot Test | | | | | | |
| --- | --- | --- | --- | --- | --- | --- | --- |
| Comp. No. | Pencil Hardness | MEK Double Rubs | 5% Acetic Acid | 10% Nitric Acid | 10% Sodium Hydroxide | 10% HCl | Water |
| 1 | HB | >64 | Fine Dense Blisters | Faint Spot | Light Pale Spot | NE | Spot |
| 2 | HB | >100 | Pale Spot | Hazy Spot | Hazy Spot | Spot | Hazy Spot |
| 3 | B | 60 | Hazy Spot | NE | NE | NE | Hazy Spot |
| 4 | B | 66 | Fine Dense Blisters | Hazy Spot | NE | NE | Fine Dense Blisters |
| 5 | B | 40 | Hazy Spot | Hazy Spot | Hazy Spot | NE | Hazy Spot |
| 6 | HB | 90 | White Spot | Hazy Spot | Hazy Spot | Hazy Spot | Hazy Spot |
| 7 | HB | 39 | Fine Dense Blisters | Faint Spot | NE | NE | Fine Dense Blisters |
| 8 | B | 60 | Fine Dense | NE | Dark Spot | NE | Fine Dense |

TABLE 3-continued

| | | Evaluation after 8 days at Room Temperature, 24 Hour Spot Test | | | | | |
|---|---|---|---|---|---|---|---|
| Comp. No. | Pencil Hardness | MEK Double Rubs | 5% Acetic Acid | 10% Nitric Acid | 10% Sodium Hydroxide | 10% HCl | Water |
| | | Blisters | | | | | Blisters |

EXAMPLE 10

To a suitable reactor were added 567 parts of 2-propoxyethanol, 94.3 parts of the diglycidyl ether of Pluronic F88 described in Example 2 and 1.9 parts of sodium benzoate. To a monomer addition funnel were added 681.9 parts of styrene, 526.4 parts of butyl acrylate, 167.9 parts of acrylic acid, and 27.7 parts of 2,2'-azobis(isobutyronitrile). Heat and agitation were applied to the reactor and the temperature was raised to 200° F. The monomer solution was then slowly added over a period of 3 hours with the temperature being held between 190° and 255° F. The monomer addition funnel was flushed with 23.1 parts of 2-propoxyethanol which was added to the reactor. Di-tertiary butyl peroxide, 7.5 parts, and 39.2 parts of 2-propoxyethanol were then added, the temperature was raised to 255° F. and was held at 250-270° F. for 3 hours. An additional 7.5 parts of ditertiary butyl peroxide were added and heating was continued for 1 hour and 45 minutes at 250° F. The resulting polymer solution had a solids content of 70.61 percent and an acid value of 74.69.

To a suitable reactor were added 932.6 parts of the above described polymer solution. Heat and agitation were applied and when the temperature reached 160° F., the addition of 328.6 parts of deionized water was begun. All of the water was added in one hour and 30 minutes with the temperature being held at 130°-180° F. Additional water, 29.9 parts, was added and stirred in followed by the addition of 146 parts of water. The resulting dispersion, at 42.39 percent solids, had a viscosity of 13,800 cps at 25° C., No. 5 spindle, 20 RPM. After 3 months, the dispersion was stable and the viscosity was 16,766 cps.

EXAMPLE 11

Using the same procedure described in Example 10, a polymer solution was prepared by adding catalyst monomer-mixture of 197.0 parts of methyl methacrylate, 525.4 parts of butyl methacrylate, 277.2 parts of butyl acrylate, 289 parts of hydroxypropyl methacrylate, 25 parts of methacrylic acid and 55.7 parts of 2,2'-azobis-(isobutyronitrile) to 544.8 parts of 2-propoxyethanol, 86.8 parts of the diglycidyl ether of Pluronic F88 and 1.2 parts of sodium benzoate and heating at 200°-245° F. for 5 hours. After the addition of 54.6 parts of 2-propoxyethanol, the resulting polymers solution had a solids content of 68.75 percent and an acid value of 16.8.

An aqueous dispersion was prepared by adding 327.8 parts of deionized water to 930.4 parts of the above described polymer solution using the procedure described in Example 10. The dispersion had a viscosity of 13,000 cps at 51.4 percent solids. After three months, the dispersion was stable with a viscosity of 14,200 cps.

EXAMPLE 12

A copolymer solution, 300 parts, made from 36.84 percent styrene, 36.84 percent butyl acrylate, 15.03 percent hydroxypropyl methacrylate and 11.29 percent acrylic acid at 72.17 percent solids in 2-butoxy ethanol was added to a reactor along with 6.7 parts of the diglycidyl ether of Pluronic F88 and 0.03 parts of sodium benzoate. Heat and agitation were applied raising the temperature to 280° F., and holding it at 280° F. for one hour. The temperature was then lowered to 170° F., and 114.4 parts of deionized water were added slowly forming a water-in-oil emulsion. After the addition of 25.3 parts of water, the emulsion inverted to an oil-in-water emulsion. The emulsion was then reduced to a solids content of 45.7 percent with additional water. The viscosity was 14,133 cps at 25° C. The dispersion was stable after 3 months with no separation.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A stable aqueous acrylic resin dispersion comprising (A) an aqueous medium and (B) the reaction product of (a) about 90 to about 98 weight percent of an acrylic resin having an acid value of about 10 to about 150, and (b) about 2 at about 10 weight percent of a diglycidyl ether of a polyoxyalkylene glycol wherein said polyoxyalkylene glycol is a block copolymer of ethylene oxide and propylene oxide with the polyoxypropylene block in the middle with terminal polyoxyethylene blocks, said polyoxyalkylene glycol having a molecular weight of about 4,000 to about 20,000, and wherein said weight percents are based on the weight of (a) and (b).

2. The dispersion of claim 1 wherein the acid value of the acrylic resin is about 75 to about 85.

3. The dispersion of claim 1 wherein the polyoxyalkylene glycol contains about 50 to about 90 weight percent polyoxyethylene blocks and about 10 to about 50 weight percent polyoxypropylene blocks.

4. The dispersion of claim 1 wherein the diglycidyl ether of the polyoxyalkylene glycol is present in the amount of about 5 to about 7 weight percent.

5. The dispersion of claim 1 wherein the acrylic resin is a copolymer of acrylic or methacrylic acid, acrylic or methacrylic esters wherein the ester group contains 1 to 4 carbon atoms, and styrene or vinyl toluene.

6. The dispersion of claim 5 wherein the acrylic resin is a copolymer of acrylic acid, butyl acrylate, and styrene.

7. A process for preparing a stable aqueous acrylic resin dispersion which comprises: (A) reacting (a) an acrylic resin in the about of about 90 to about 98 weight percent and having an acid value of about 10 to about 150 with (b) about 2 to about 10 weight of a diglycidyl ether of a polyoxyalkylene glycol for a time sufficient to react the glycidyl groups of the diglycidyl ether with the acid groups of the acrylic resin, wherein said polyoxyalkylene glycol is a block copolymer of ethylene oxide and propylene oxide with the polyoxypropylene block in the middle with terminal polyoxyethylene blocks, said polyoxyalkylene glycol having a molecular weight of about 4,000 to about 20,000, and wherein said weight percents are based on the weight of (a) and (b); and (B) adding sufficient water with agitation to the reaction product of (A) to form first a water-in-oil emulsion followed by inversion to an oil-in-water emulsion.

8. The process of claim 7 wherein the acrylic resin and the diglycidyl ether of the polyoxyalkylene glycol are reacted at a temperature of about 225° F. to about 300° F.

9. The process of claim 7 wherein the acid value of the acrylic resin is about 75 to about 85.

10. The process of claim 7 wherein the polyoxyalkylene glycol contains about 50 to about 90 weight percent polyoxypropylene blocks and about 10 to about 50 weight percent polyoxypropylene blocks.

11. The process of claim 7 wherein the diglycidyl ether of the polyoxyalkylene glycol is present in the amount 5 to about 7 weight percent.

12. The process of claim 7 wherein the acrylic resin is a copolymer of acrylic acid or methacrylic acid, acrylic or methacrylic esters wherein th ester group contains 1 to 4 carbon atoms, and styrene or vinyl toluene.

13. The process of claim 12 wherein the acrylic resin is a copolymer of acrylic acid, butyl acrylate, and styrene.

14. The process of claim 7 wherein the reaction product of the acrylic resin and the diglycidyl ether of the polyoxyalkyene glycol is prepared by polymerizing acrylic monomers in the presence of the diglycidyl ether of the polyoxyalkylene glcyol.

15. A curable composition comprising a blend of the stable dispersion of claim 1 and a polyglycidyl ether of a polyhydric phenol.

16. The curable composition of claim 15 wherein the polyhydric phenol is p,p'-dihydroxydiphenyl propane.

* * * * *